US010066929B1

(12) United States Patent
Gu et al.

(10) Patent No.: US 10,066,929 B1
(45) Date of Patent: Sep. 4, 2018

(54) METHOD FOR MEASURING RESIDUAL STRAIN FOR CURED COMPOSITE PART

(71) Applicant: THE BOEING COMPANY, Chicago, IL (US)

(72) Inventors: Haozhong Gu, Ballwin, MO (US); Ying Shan, Mukilteo, WA (US); Chi Ho Eric Cheung, Everett, WA (US); Aaron N. Rinn, Edmonds, WA (US); Jeffrey Olberg, Federal Way, WA (US); Kevin E. McCrary, Auburn, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/496,264

(22) Filed: Apr. 25, 2017

(51) Int. Cl.
| | |
|---|---|
| *G01N 11/00* | (2006.01) |
| *G01B 11/16* | (2006.01) |
| *G06T 7/00* | (2017.01) |
| *H04N 13/02* | (2006.01) |

(52) U.S. Cl.
CPC .............. *G01B 11/16* (2013.01); *G06T 7/001* (2013.01); *G06T 2207/10012* (2013.01); *G06T 2207/30164* (2013.01); *H04N 13/0239* (2013.01)

(58) Field of Classification Search
CPC .................... G01B 11/16; G06T 7/001; G06T 2207/10012; G06T 2207/30164; H04N 13/0239
USPC ......................................................... 73/823
See application file for complete search history.

(56) References Cited

U.S. PATENT DOCUMENTS

| 8,264,675 B1* | 9/2012 | Danyluk | G01B 11/168 |
| | | | 356/33 |
| 8,836,934 B1* | 9/2014 | Safai | G06T 7/001 |
| | | | 356/237.3 |
| 2002/0051514 A1* | 5/2002 | Ruud | G01N 23/04 |
| | | | 378/72 |

(Continued)

FOREIGN PATENT DOCUMENTS

| JP | 2005010003 A | 1/2005 |
| JP | 2011027526 A | 2/2011 |
| WO | WO-2008146532 A1 | 12/2008 |

OTHER PUBLICATIONS

Standard Test Method for Photoelastic Measurement of Birefringence and Residual Strains in Transparent or Translucent Plastic Materials, ASTM Standard D4093-95 2.

(Continued)

*Primary Examiner* — Max Noori
(74) *Attorney, Agent, or Firm* — Marshall, Gerstein & Borun LLP (57) ABSTRACT

Method for measuring residual strain in a cured composite part includes taking a first image of at least two spaced apart particles positioned on a side of the cured composite part with the side positioned transverse to a first face side. The cure composite part includes a first ply has fibers and a second ply has fibers wherein the first ply and the second ply are positioned in overlying relationship to one another. At least a portion of the fibers of the first ply are positioned in angular relationship with at least a portion of the fibers of the second ply. The at least two spaced apart particles are associated with the second ply. Further included is a step of removing at least a portion of the first ply and taking a second image of the at least two spaced apart particles.

20 Claims, 7 Drawing Sheets

(56) References Cited

U.S. PATENT DOCUMENTS

2012/0065789 A1* 3/2012 Scelzi .................... G01K 17/20
 700/291
2016/0102973 A1* 4/2016 Gonze .................. G01B 11/272
 356/138

OTHER PUBLICATIONS

Standard Test Method for Linear Coefficient of Thermal Expansion of Rock Using Bonded Electric Resistance Strain Gauges, ASTM Standard D5335-14 3.

Determining Residual Stresses by the Hole-Drilling Strain-Gage Method, ASTM Standard E 837 4.

Vishay Precision Group, "Measurement of Residual Stresses by the Hole-Drilling* Strain Gage Method", Tech Note TN-503, Nov. 2010.

Extended European Search Report for EP Application No. 18152008.1 dated Jul. 4, 2018.

\* cited by examiner

METHOD FOR MEASURING RESIDUAL STRAIN FOR CURED COMPOSITE PART

FIELD

This disclosure relates to measuring residual strain in a composite part and more particularly measuring the residual strain of a composite part resulting from the composite part exposed to elevated thermal conditions in the curing process.

BACKGROUND

Residual strain is developed within a composite part with the elevation in temperature and the chemical reactions which the composite part experiences during the curing process. Residual strain retained within a cured composite part facilitates cracking of the composite material and affects fatigue performance of the composite part. Understanding the amount of residual strain retained within various locations within the composite part provides useful information for a designer and/or fabricator in providing them an opportunity to reduce the cracking phenomenon and improve the fatigue performance of the composite part.

Existing methods are used to measure residual strain in an isotropic plastic material which is not a composite material which includes fibers. Thermal strains in composite parts have been measured by measuring the change of strain by increasing the temperature of the composite part to the cure temperature. This methodology however does not measure the residual strain but only measures strain imparted to the composite part up to the cure temperature.

There is a method employed for measuring residual strains in isotropic material which includes hole-drilling into the part and installation of a strain gage that measures residual strain at the surface of the part. The use of hole-drilling limits the geometry of material removal which in turn limits the application to a low-gradient strain field. If a complex, high gradient strain field is of interest, the removal process must involve geometries much more complex than a circular hole. The use of a strain gage also limits the spatial resolution of strain measurements as the resolution is limited by the size of the gage and further limited by the occupation of space associated with the part being measured with wiring. In addition, existing methods can only measure limited locations with respect to the part due to the finite amount of strain gages that are employable and cannot be used to measure a full-field of strain distribution.

There is a need for measuring residual strain within a cured composite part which has been retained within the composite part from the cure process wherein a full field, high gradient and multi-axial strain measurements can be taken on the surface of the composite part. Furthermore, there is a need to eliminate geometry restraints imposed by the installation or placement of strain gages. Moreover a method is needed that can readily enable measurement of strain in any target geometry and around any strain gradient field of interest.

SUMMARY

An example includes a method for measuring residual strain in a cured composite part which includes the step of taking a first image of at least two spaced apart particles positioned on a side of the cured composite part with the side positioned transverse to a first face side. The cured composite part includes a first ply including fibers and a second ply including fibers. The first ply and the second ply are positioned in overlying relationship to one another. At least a portion of the fibers of the first ply are positioned in angular relationship with at least a portion of the fibers of the second ply. The at least two particles positioned on the side of the cured composite part are associated with the second ply. The method further includes removing at least a portion of the first ply and taking a second image of the at least two spaced apart particles after the at least a portion of the first ply has been removed from the cured composite part.

An example of a system for measuring residual strain in a cured composite part includes a first ply includes fibers and a second ply includes fibers wherein the first ply and the second ply are positioned in overlying relationship and at least a portion of the fibers of the first ply are in angular relationship with at least a portion of the fibers of the second ply. At least two spaced apart particles are positioned on the side associated with the second ply. The system further includes a camera assembly including two spaced apart cameras wherein each camera is in optical alignment with the at least two spaced apart particles.

The features, functions, and advantages that have been discussed can be achieved independently in various embodiments or may be combined in yet other embodiments further details of which can be seen with reference to the following description and drawings.

DESCRIPTION

The measuring of residual strain of a cured composite part provides a designer and fabricator beneficial information regarding the composite part. Residual strain within a composite part can facilitate the occurrence of cracking and affect fatigue performance of the composite part placed into service. As mentioned above, there is a need to provide a method for measuring the residual strain retained in a cured component part in strain gradient fields of interest within a composite part without the imposition of the encumbrances and limitations of strain gages and hole-drilling. The method and system to be described herein will provide obtaining desired strain field information without the imposition of the encumbrances and limitations incurred with employing strain gages and hole-drilling with respect to a composite part.

The method and system to be described herein will release the residual strain of a cured composite part and permit direct measuring of the residual strain in a field of interest with use of digital camera imaging. The method and the use of the system, as will be understood, provides the opportunity to obtain measurement of a full-field strain distribution, measurements with high resolution, measurements of high gradient strain field of interest and measurements of multi-axial strain measurements on the surface of the part. Moreover, the method and use of the system eliminates geometry limitations because the residual strain measurement is not limited by strain gage installation or placement. The method and system described herein operates with removal of material of the composite part relieving restraint of the residual strain and providing optical digital imaging to facilitate the measuring of the residual strain. The operation of the method and the system herein described provides versatility in accessing residual strain measurements in particular geometries and sequences enabling the measurement of residual strain in any target geometry and with respect to a strain gradient field of interest.

Figure 1:
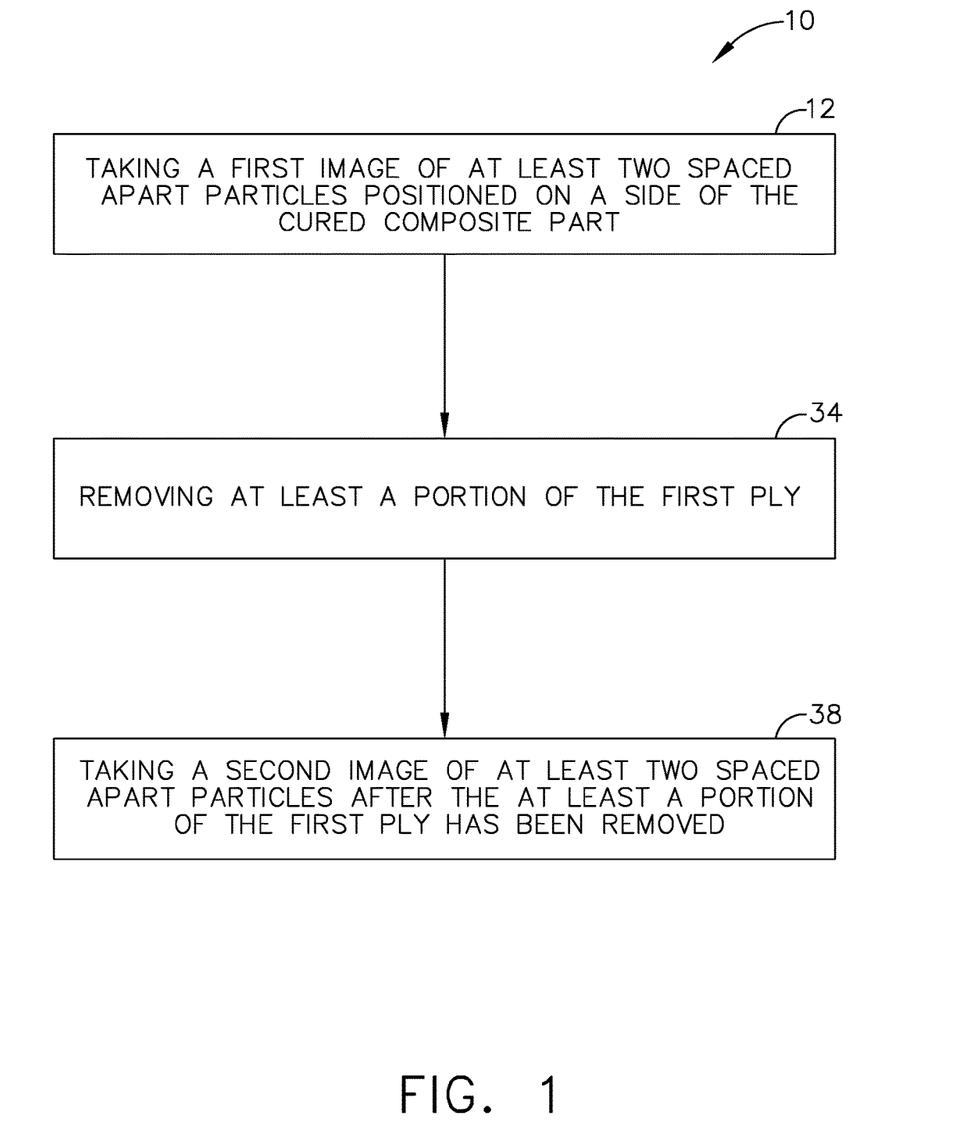
FIG. 1 includes a flow chart of a method for measuring residual strain in a cured composite part.
Figure 2:
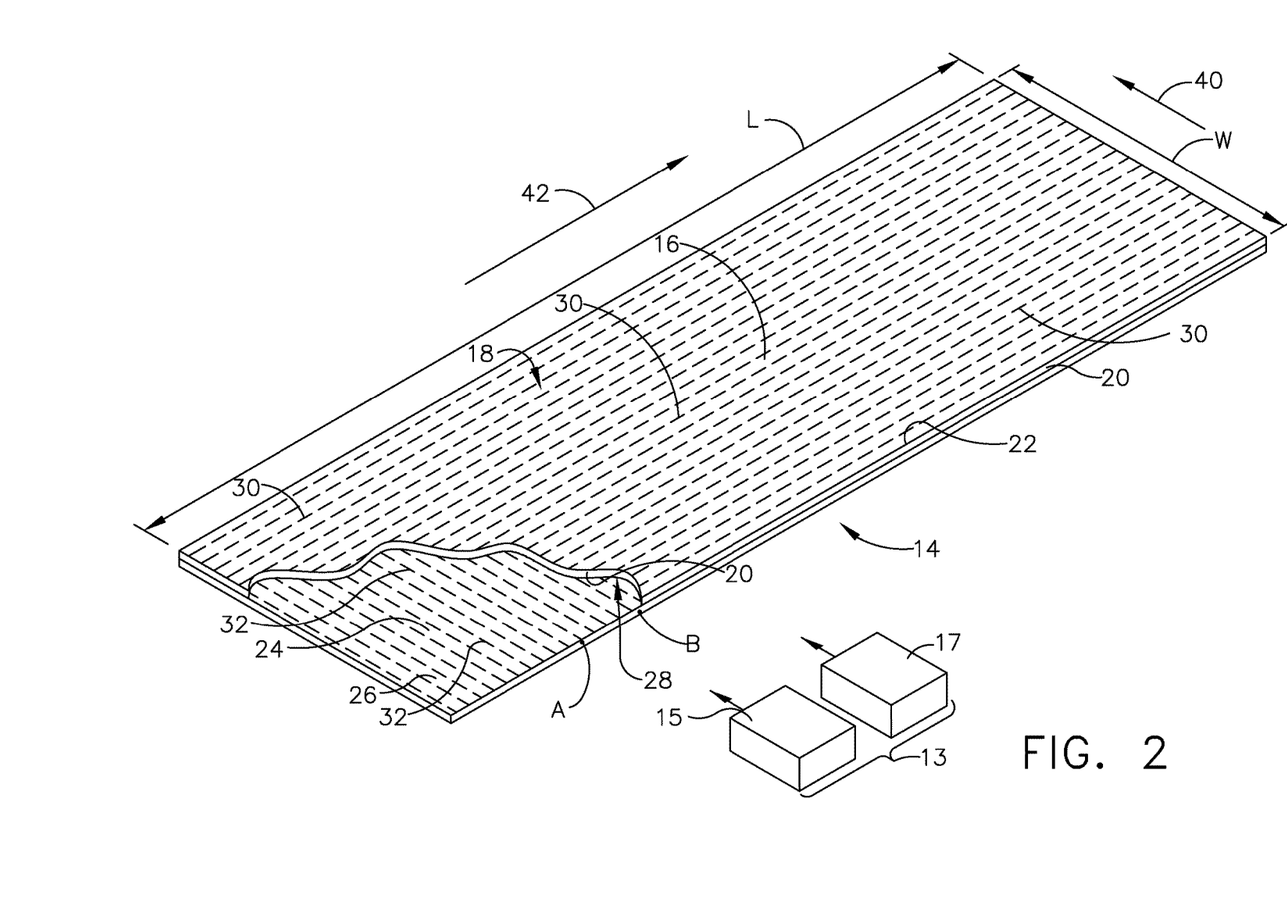
FIG. 2 is a perspective partially broken away view of the first example of the composite part and cameras used for measuring residual strain in a cured composite part.

In referring to FIG. 1, method 10 for measuring residual strain of a cured composite part includes step 12 of taking a first image, with digital camera assembly 13, as seen in FIG. 2, including spaced apart digital cameras 15 and 17, of at least two spaced apart particles, A and B, for example. At least two spaced apart particles, A and B, in this example, are positioned on side 14 of cured composite part 16 with side 14 positioned transverse to first face side 18. Cured composite part 16 includes first ply 20 which includes first side 22 positioned on first face side 18 of composite part 16. Second ply 24 includes first side 26 positioned on and along an opposing second side 28 of first ply 20. First ply 20 includes fibers 30 and second ply 24 includes fibers 32. First ply 20 and second ply 24 are positioned in overlying relationship to one another. At least a portion of fibers 30 of first ply 20 are positioned in angular relationship with at least a portion of fibers 32 of second ply 24. In this example, fibers 30 and fibers 32 of first ply 20 and second ply 24, respectively, extend transverse to one another. At least two spaced apart particles A and B are positioned on side 14 of cured composite part 16 and are associated with second ply 24. In this example two spaced apart particles A and B are positioned on second ply 24.

Method 10 further includes step 34 of removing at least a portion 36 (shown as removed portion of first ply 20 in FIG. 3) of first ply 20. As will be discussed in more detail herein, portion 36 of first ply 20 is abraded from composite part 16. With the removal of at least a portion 36 of first ply 20, fibers 30 from the at least a portion 36 of first ply 20 are thereby removed. Fibers 30 of portion 36 of first ply 20 were positioned in angular relationship with respect to fibers 32 of second ply 24 and restrained fibers 32 in strained position attained from the curing process. The removal of the at least a portion 36 of first ply 20 or, in some examples of method 10 removal of all of first ply 20, fibers 30 within portion 36 are correspondingly removed removing the restraint placed on fibers 32 and allowing fibers 32 to relax and the residual strain in fibers 32 to reverse. The reversal of the residual strain allows composite part 16 to contract from the tension which had occurred during curing.

Figure 3:
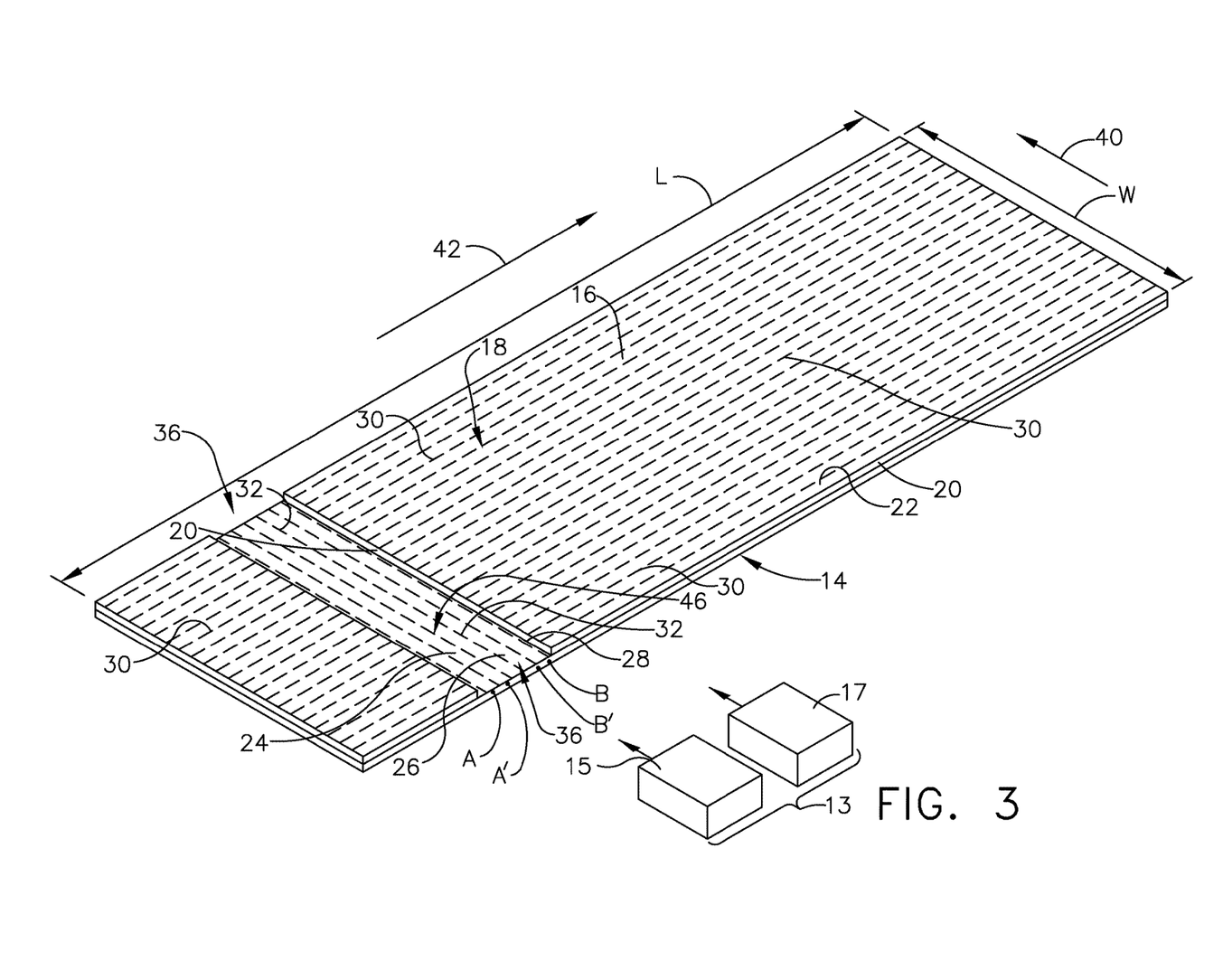
FIG. 3 is a perspective view of the first example of the composite part and cameras of FIG. 2 with at least a portion of the first ply removed.

A frame of reference for cured composite part 16, with residual strain restrained, is shown with at least two spaced apart particles A and B positioned on second ply 24 on side 14 of composite part 16, as seen in FIG. 2. The positions of the at least two particles A and B are initial reference points on cured part 16, wherein first ply 20 and second ply 24 have incurred strain as a result of the curing of composite part 16. Thus, with step 34 of removing at least a portion 36 of first ply 20, restraint which had been imparted by first ply 20 to second ply 24 at that location of portion 36 is removed. Second ply 24 at the location relaxes allowing second ply 24 at that location to reverse the residual strain imparted to second ply 24 from the curing process. As a result, as seen in FIG. 3, the original positions of at least two particles A and B, prior to removal of portion 36, move to new respective positions A' and B', respectively with the removal of portion 36.

Method 10 further includes step 38 of taking a second image of at least two spaced apart particles A and B which have now moved to positions A' and B' respectively with the reverse of the residual strain contracting second ply 24 after the removal of at least a portion 36 of first ply 20. In this example, as seen in FIG. 2, composite part 16 was initially positioned in a predetermined position and digital camera assembly 13 was positioned in a second predetermined position at the time step 12 of taking the first image took place. In this example, composite part 16 is removed from the predetermined position with the completion of step 12 of taking the first image. With the removal of at least a portion 36 of first ply composite part 16, composite part 16 is re-positioned at the predetermined position with digital camera assembly 13 having remained in the second predetermined position, as seen in FIG. 3. Thus, with step 38 of taking of the second image performed, the shift of positions of the at least two particles of A and B to A' and B' respectively, represents the residual strain that was retained in composite part 16 from the curing process within this field of interest prior to the removal of portion 36 of first ply 20. As a result, determining the residual strain, as will be discussed herein, is directly measured and ascertained through use of digital optical camera assembly 13 without being encumbered by the limitations imposed by strain gages and hole-drilling composite part 16.

Method 10 for measuring residual strain of a cured composite part further includes preparing cured composite part 16 prior to step 12 of taking the first image. Preparing cured composite part 16 includes, in this example, coating side 14 of composite part 16, which includes in this example coating edges of first ply 20 and the second ply 24 with paint. With the paint applied, which provides a visual background for side 14, the preparing of composite part 16 further includes distributing a plurality of particles onto the paint wherein the plurality of particles are in visual contrast with the paint. The distributing of the plurality of particles onto the paint includes, in this example, spraying of the particles onto the paint. The plurality of particles can include toner and/or include paint speckles.

The plurality of particles 39 can be seen for example in FIGS. 7 and 8 for composite part 16' which will be discussed herein. The visual contrast between the paint as background and the particles 39 provide ease in identification of at least two particles A and B. The contrast can be accomplished with using different colors and/or brightness in colors that are applied. Application of clear coat over the paint and particles 39 provide protection to the particles when, for example, at least a portion 36 of first ply 20 is removed. A visual contrast in this example employs white paint and black toner particles 39.

As seen in FIG. 3, in step 12 of taking first image in this example includes fibers 30 of first ply 20 extend in a first direction 40 across width W of cured composite part 16 and fibers 32 of second ply 24 extend in a second direction 42 along length L of cured composite part 16. In this example, second direction 42 is transverse to first direction 40. As mentioned earlier the restraint maintained between first ply 20 and second ply 24 is accomplished with at least a portion of fibers 30 are positioned in angular relationship with at least a portion of fibers 32.

Fibers 30 of first ply 20 in this example are in angular relationship with fibers 32 of second ply 24 and restrain the strain that has been imparted to composite part 16 during the curing process. This restraint can be accomplished with various different directional extending fibers between first ply 20 and second ply 24. This angular direction of fibers can be accomplished a number of different ways. For example, unidirectional fibers in first ply 20 can be angularly oriented relative to unidirectional fibers in second ply 24. Woven fibers within first ply 20 and woven fibers in second ply 24 can be angularly oriented with respect to one another. Using different fiber structures within first ply 20 and second ply 24 can be employed, for example, a unidirectional fiber may be employed in first ply 20 and angularly oriented with respect to a woven fiber in second ply 24. Various combinations of fibers positioned within first ply 20 and second ply 24 can provide the needed angular orientation between fibers of the two plies. Additional angular orientations of fibers can also be accomplished with utilizing chopped fibers 44 as seen for example in second ply 24 in FIG. 6. In this example, at least a portion of chopped fibers 44, which extend in a plurality of directions, are in angular relationship with respect to fibers in the plies between which second ply 24 is sandwiched, as will be discussed further herein. The restraint, in the example shown in FIGS. 2 and 3, is accomplished so long as an angular relationship of at least a portion of the fibers of first ply 20 is established with at least a portion of the fibers within second ply 24. In FIGS. 2 and 3 chopped fibers 44 can be employed in one or both of first and second plies 30 and 32.

In referring to FIG. 2, step 12 for taking the first image includes taking the first image stereographically and locating and identifying at least two spaced apart particles A and B which in this example are located on second ply 24. At least two spaced apart particles A and B can be seen in FIG. 2 and for example in FIG. 7. Digital camera assembly 13 in this example, as seen in FIG. 2, includes two spaced apart digital cameras 15 and 17 taking a stereographic image of at least two spaced apart particles A and B positioned on side 14 of composite part 16. In this example wherein two plies 20 and 24 are used, it is beneficial to select at least two spaced apart particles on second ply 24 in a position such that with removal of at least a portion 36 of first ply 20, at least two particles A and B are not damaged or removed. Also it is beneficial to select at least two spaced apart particles A and B within an alignment of first recess 46 where at least a portion 36 of first ply 20 has been removed as seen in FIG. 3. In the employment of method 10, numerous pairs of particles can be selected to be used for measuring residual strain within a selected field of interest.

In step 34 for removing at least a portion 36 of first ply 20 as seen in FIG. 3, wherein portion 36 has been removed, includes in this example, removing a portion of first ply 20 less than an entire length L of side 14 of cured composite part 16. In addition, in this example step 34 of removing at least a portion 36 of first ply 20 further includes removing the at least a portion of the first ply 20 along width W of cured composite part 16. In this example, at least a portion 36 of first ply 20 includes the entire width W of cured composite part 16, as seen in FIG. 3. It should be understood, a portion of first ply 20 or all of first ply 20 could be removed in carrying out Method 10 for measuring the residual strain within composite part 16 herein.

Step 34 of removing at least a portion 36 of first ply 20 includes using an abrading tool (not shown) and abrading, in this example, portion 36 away from first ply 20 of composite part 16 and forming a first recess 46 in composite part 16, as seen in FIG. 3. In this example recess 46 extends across a portion of length L and across an entire width W of composite part 16. With having exercised step 34 of removing at least a portion 36 of first ply 20, as seen in FIG. 3, step 38 can be employed for taking second image of two spaced apart particles A and B positioned on side 14. In this example, particles A and B are positioned on second ply 24 of cured composite part 16.

With at least a portion 36 of first ply 20 removed, two spaced apart particles A and B have now moved to positions A' and B' respectively. They have moved corresponding to a reverse of the residual strain which had been originally imparted to composite part 16 as a result of curing. As a result, of determining the change of positions of A to A' and B to B' and understanding the difference in locations between A and B and the current difference in locations between A' and B', determining the residual strain is measured and ascertained in this field of interest for cured composite part 16.

In referring to FIGS. 4-6 and 7 and 8, method 10 for measuring residual strain in a cured composite part 16' is shown and discussed herein with respect to composite part 16' including three overlying plies of composite material. The numbering identification of elements in association with two ply construction of composite part 16 shown in FIGS. 2 and 3 that are similar elements with respect to the three ply construction of composite part 16' of FIGS. 4-6 and 7 and 8 will have the same numbering. In referring to FIG. 4, step 34 of taking a first image includes composite part 16' having third ply 48 which includes a first side 50 positioned on and along an opposing second side 52 of second ply 24 such that third ply 48 is in overlying relationship with second ply 24 and such that second ply 24 is positioned between first ply 20 and third ply 48. Third ply 48 includes fibers 54 wherein at least a portion of fibers 54 of third ply 48 are positioned in angular relationship with at least a portion of fibers 32 of second ply 24. The first image is taken with digital camera assembly 13 with spaced apart digital cameras 15 and 17 taking a stereographic image.

Figure 5:
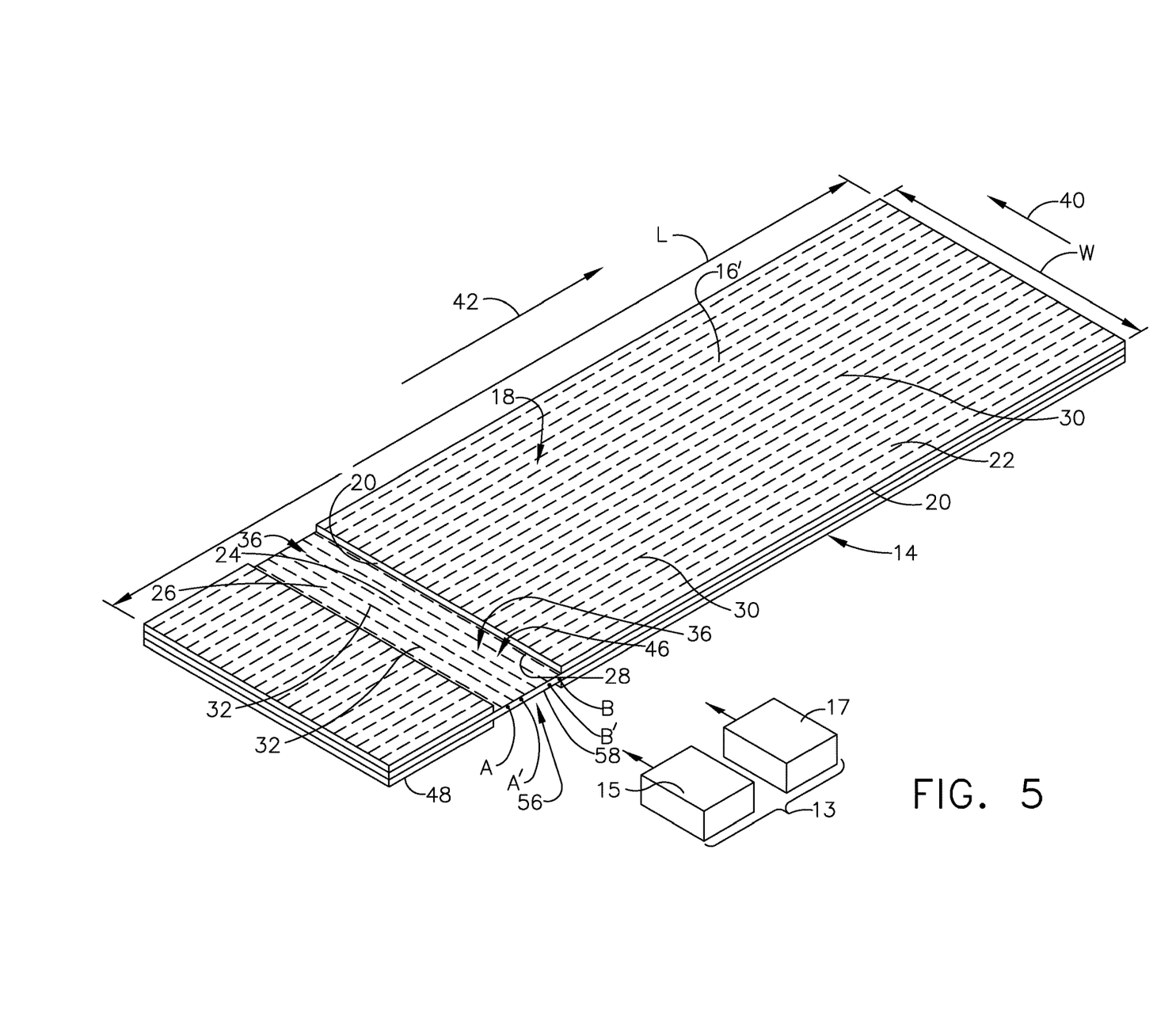
FIG. 5 is a perspective view of the second example of the composite part of FIG. 4 with at least a portion of the first ply removed and a portion of a third ply removed.

In referring to FIG. 5, step 34 of removing at least a portion 36 of first ply 20 includes the at least a portion 36 of first ply 20 removed forms, in this example, first recess 46 in cured composite part 16' aligned with at least two particles A and B. Step 34 of removing at least a portion 36 of first ply 20 further includes removing at least a portion 56 of third ply 48 forming second recess 58 in cured composite part 16' aligned with the at least two particles A and B. In this example, the at least two particles A and B are positioned on second ply 24 so as not to be damaged or removed at the time of removal of the at least a portion 36 of first ply 20 and removal of at least a portion 56 of third ply 48. Step 34 of removing at least a portion 36 of first ply 20 and at least a portion 56 of third ply 48, as seen removed in FIG. 5, is accomplished in this example with abrading with an abrading tool first ply 20 and third ply 48.

Step 34 for removing at least a portion 36 of first ply 20 and at least a portion 56 of third ply 48 can be seen in FIG. 5 wherein portion 36 and 56 have been removed. Portion 36 has been removed with removing a portion of first ply 20 less than an entire length L of side 14 of cured composite part 16 and portion 56 has been removed with removing a portion of third ply 48 less than an entire length L of side 14 of cured composite part 16. In addition, in this example step 34 of removing at least a portion 36 of first ply 20 further includes removing the at least a portion 36 of the first ply 20 along width W of cured composite part 16' and includes removing at least a portion 56 of third ply 48 along width W of composite part 16'. In this example, at least a portion 36 of first ply 20 and at least a portion 56 of third ply 48 include the entire width W of cured composite part 16'. It should be understood, a portion of first ply 20 or all of first ply 20 can be removed and a portion of third ply 48 or all of third ply 48 can be removed in carrying out measuring the residual strain. In the case of less than all of first ply 20 and all of third ply 48 being removed, with portions 36 and 56 removed, respective recesses 46 and 58 formed in first ply 20 and third ply 48, respectively, are positioned symmetrically positioned relative to cured composite part 16'. In this example, with removal of at least a portion 36 of first ply 20 and removal of at least a portion 56 of third ply 48 having occurred, step 38 of the taking of the second image of the at least two spaced apart particles A and B takes place.

Figure 4:
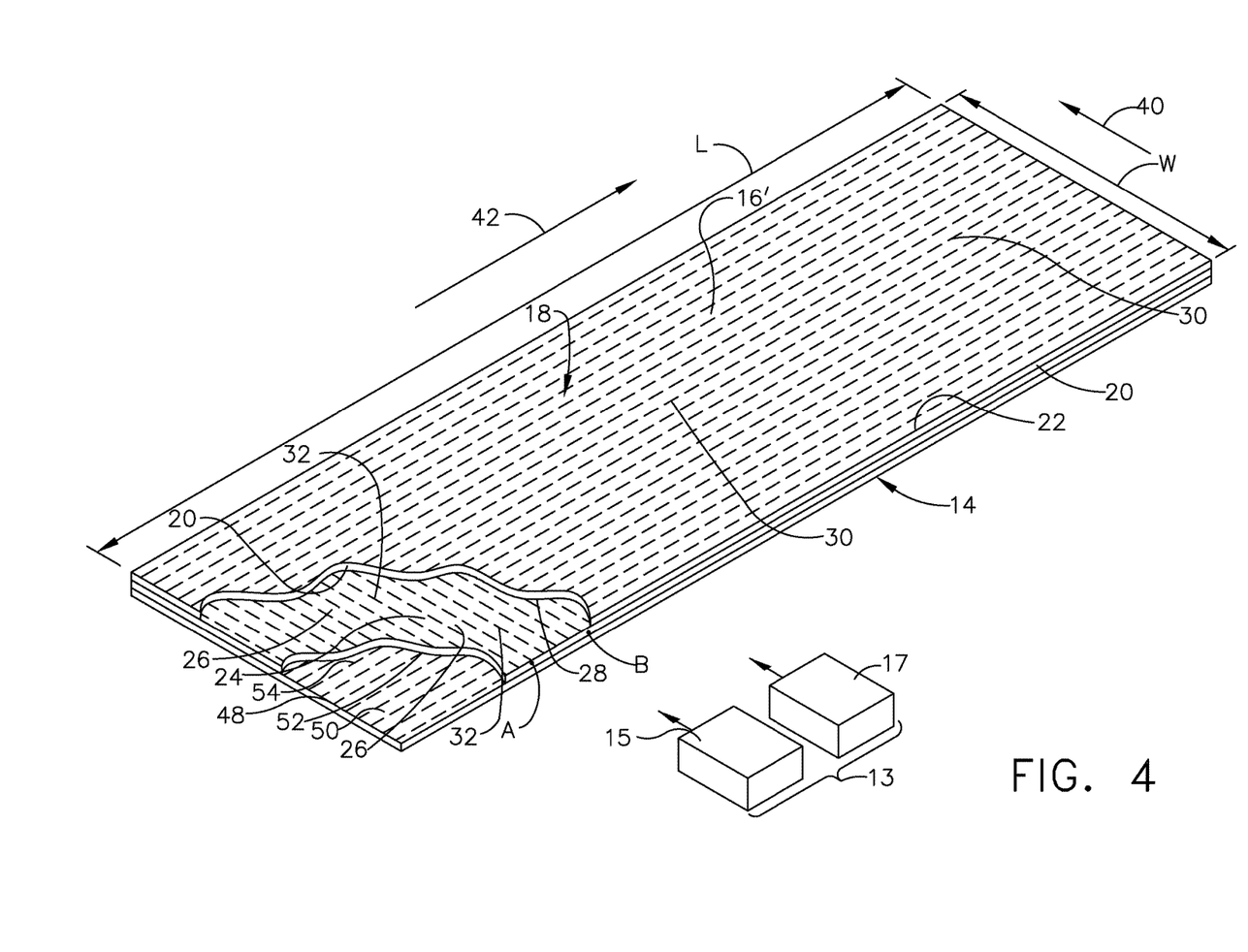
FIG. 4 is a perspective partially broken view of the second example of the composite part and cameras used for measuring residual strain in a cured composite part.

As mentioned earlier for positioning of composite part 16 in a predetermined position, likewise composite part 16' is positioned in a predetermined position as seen in FIG. 4 and digital camera assembly 13 is positioned in a second predetermined position at the time of taking the first image of at least two particles A and B. In this example, composite part 16' is removed from the predetermined position to remove at least a portion 36 and at least a portion 56 of first and third plies 20 and 48 respectively and is returned to the predetermined position as seen in FIG. 5 with digital camera assembly 13 having remained in second predetermined position in FIG. 5. With composite part 16' in the predetermined position, step 38 of taking the second image of the at least two spaced apart particles A and B occurs with using digital camera assembly 13 having digital camera 15 spaced apart from digital camera 17 taking a stereographic image.

Figure 7:
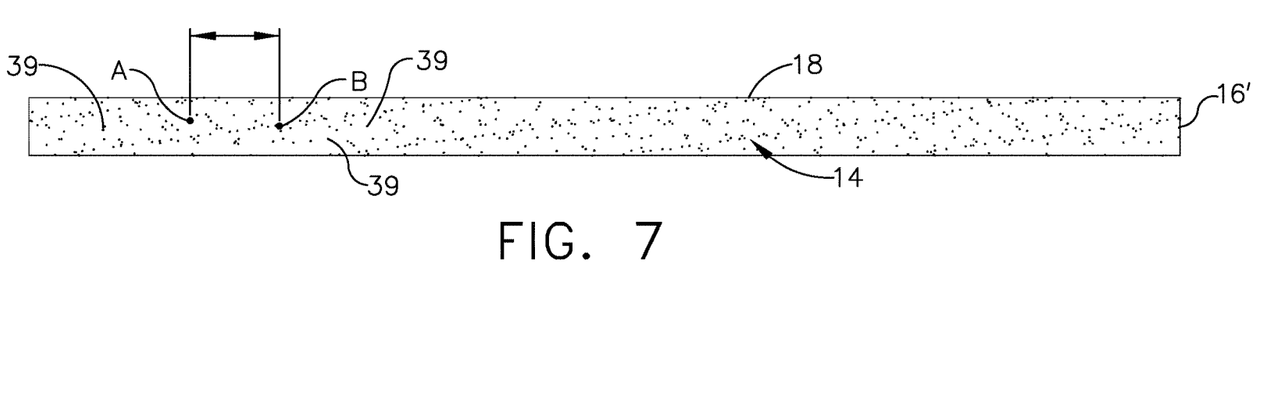
FIG. 7 is a side elevation view of FIG. 4 showing two spaced apart particles on the side.
Figure 8:
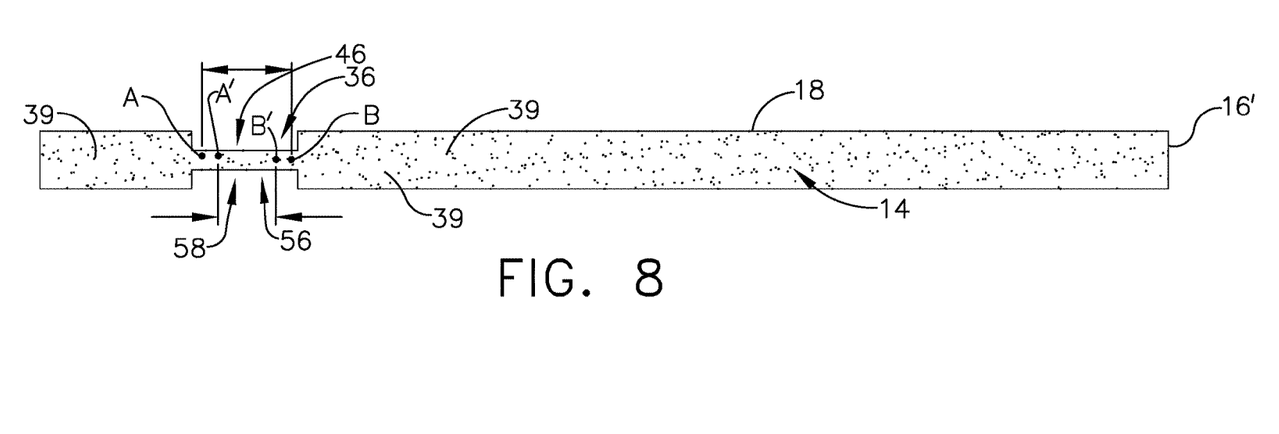
FIG. 8 is a side elevation view of FIG. 5 showing at least a portion of the first ply and at least a portion of the third ply removed, the original position of the spaced apart particles shown in FIG. 7 and the position of the spaced apart particles at new locations after the removal of the at least a portion of the first and third plies.

As discussed earlier with respect to composite part 16, composite part 16' likewise incurred strain during the curing process and the at least two spaced apart particles A and B as seen in FIG. 7 represent positions on composite part 16 wherein composite part 16 has incurred strain in contracting during the curing process. With the removal of portion 36 of first ply 20 and portion 56 of third ply 48, second ply 24 at first recess 46 and at second recess 56 relaxes and the residual strain reverses moving particles A and B to new positions to now be positioned on contracted second ply 24 to A' and B' as seen in FIG. 8. With positioning of composite part 16' placed back into the predetermined position step 38, taking the second image takes place and the shifting of positions of particles A and B to particles being positioned at positions A' and B' will be a result of the removal of the residual strain in composite part 16'.

With at least a portion 36 of first ply 20 removed and at least a portion 56 removed from third ply 48 in this example, two spaced apart particles A and B have now moved to positions A' and B' respectively. They have moved, as seen in FIGS. 7 and 8, corresponding to a reverse of the residual strain which had been originally imparted to composite part 16' as a result of curing. As a result, of determining the change of positions of A to A' and B to B' and understanding the difference in locations between A and B and the current difference in locations between A' and B', determining the residual strain is measured and ascertained in this field of interest for cured composite part 16'.

Figure 6:
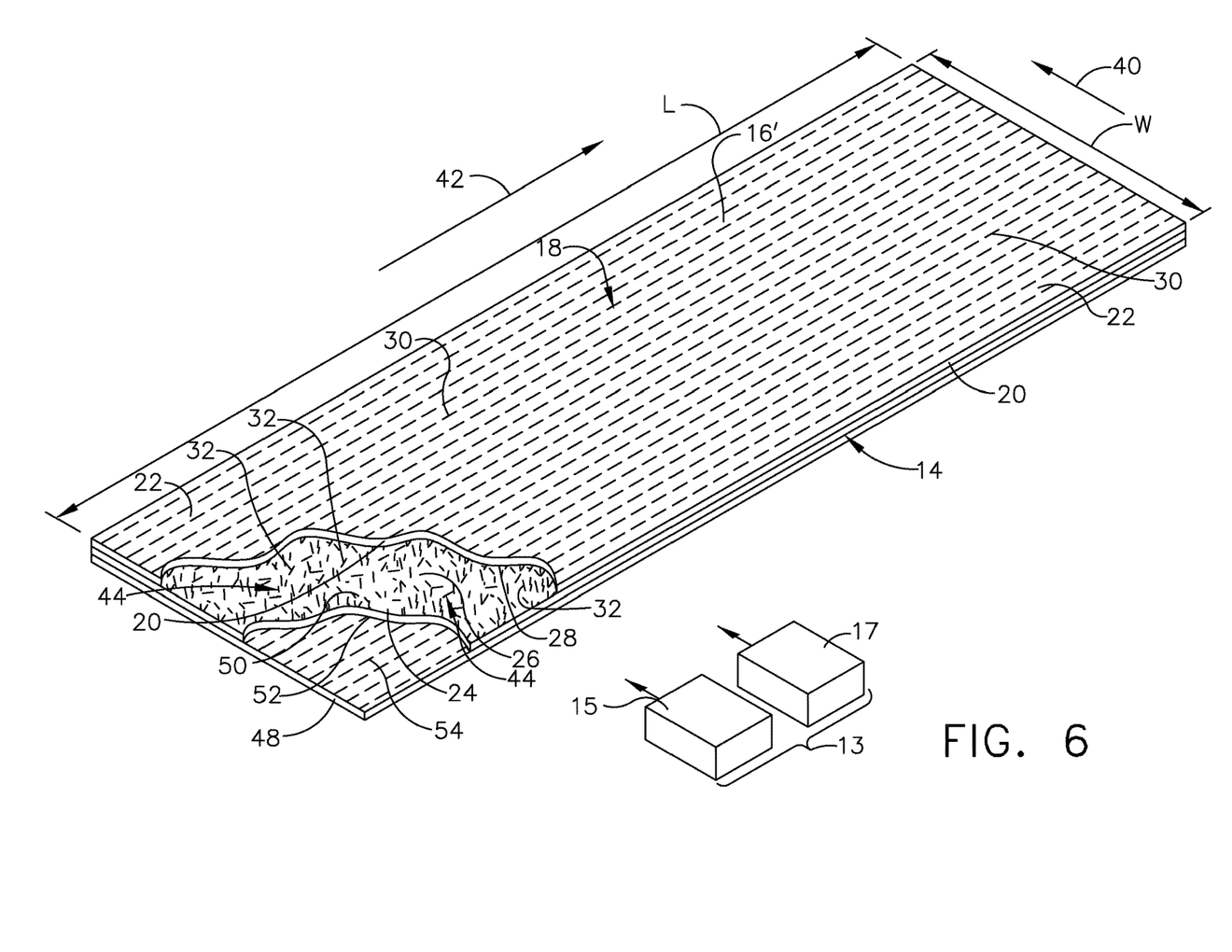
FIG. 6 is a perspective partially broken away view of FIG. 4 of the second example of the composite part with the second ply having chopped fibers.

As seen in the example shown for composite part 16' in FIG. 4, fibers 30 of first ply 20 and fibers 54 of third ply 48 extend in first direction 40 and fibers 32 in second ply 24 extend in a second direction 42. As similarly discussed above with respect to composite part 16, the angular relationship between at least a portion of fibers 30 within first ply 20 with respect to fibers 32 of second ply 24, on the one hand, and an angular relationship between at least a portion of fibers 54 within third ply 48 with respect to fibers 32 of second ply 24 provide restraint of residual strain in composite part 16'. Numerous configurations of fibers as discussed earlier can be employed between first ply 20, second ply 24 and also third ply 48 can be provided to accomplish needed restraint of residual strain which then can later be released. Another example of this configuration is shown in FIG. 6 wherein the fibers 30 of first ply 20 and fibers 54 of third ply 48 extend in first direction 40 and fibers in second ply 24 are chopped fibers 44 which extend in a plurality of directions. Other configurations of use of chopped fibers can be employed in one or more of first ply 20, second ply 24 and third ply 48.

In example shown in FIGS. 4 and 5, restraint on fibers 32 in second ply 24 will be released upon the removal of portion 36 of first ply 20 and portion 56 of third ply 48. The restraint is obtained as discussed above as a result of the angular relationship between fibers 30 in first ply 20 and fibers 32 in second ply 24 and the angular relationship between fibers 54 in third ply 48 and fibers 32 in second ply 24. Restraint can be accomplished in second ply 24 as discussed above with numerous varied arrangements of fibers 30, 32 and 54. These arrangements includes but are not limited to use of unidirectional fibers, woven fibers, chopped fibers (which extend in a plurality of directions) and combinations of these arrangements which are angularly arranged between plies as discussed above.

Further included is a system for measuring residual strain in a cured composite part, which includes first ply 20 which includes first side 22 positioned on first face side 18 of cured composition part 16 and second ply 24 including first side 26 positioned on and along an opposing second side 28 of first ply 20 wherein first ply 20 and second ply 24 are positioned in overlying relationship to one another. First ply 20 includes fibers 30 and second ply 24 includes fibers 32 wherein at least a portion of fibers 30 of first ply 20 are in angular relationship with at least a portion of fibers 32 of second ply 24. At least two spaced apart particles A and B are positioned on side 14 associated with second ply 24. Further the system includes camera assembly 13 which includes two spaced apart digital cameras 15 and 17 wherein each camera is in optical alignment with the at least two spaced apart particles A and B. Additionally, the system further includes an abrading tool (not shown) in association with first ply 20 for removing at least a portion 36 of first ply 20 in alignment with the at least two spaced apart particles A and B. The system as described herein facilitates the measuring of residual strain in cured composite part 16.

While various embodiments have been described above, this disclosure is not intended to be limited thereto. Variations can be made to the disclosed embodiments that are still within the scope of the appended claims.

What is claimed:

1. Method for measuring residual strain in a cured composite part, comprising the steps of:
   taking a first image of at least two spaced apart particles positioned on a side of the cured composite part with the side positioned transverse to a first face side wherein the cured composite part comprising a first ply comprising fibers and a second ply comprising fibers wherein:
   the first ply and the second ply are positioned in overlying relationship to one another;
   at least a portion of the fibers of the first ply are positioned in angular relationship with at least a portion of the fibers of the second ply; and
   the at least two spaced apart particles positioned on the side of the cured composite part are associated with the second ply;
   removing at least a portion of the first ply; and
   taking a second image of the at least two spaced apart particles after the at least a portion of the first ply has been removed from the cured composite part.

2. The method of claim 1 further including a step of preparing the cured composite part prior to taking the first image, comprising:
   coating the side of the cured composite part comprising edges of the first ply and the second ply with a paint; and
   distributing a plurality of particles onto the paint.

3. The method of claim 2 wherein distributing the plurality of particles onto the paint include the plurality of particles are in visual contrast with the paint.

4. The method of claim 2 wherein the distributing the plurality of particles onto the paint includes spraying of the particles onto the paint.

5. The method of claim 2 wherein the distributing the plurality of particles includes the plurality of particles comprising toner.

6. The method of claim 2 wherein the distributing the plurality of particles includes the plurality of particles comprising paint speckles.

7. The method of claim 2 the step of preparing the cured composite part further including applying a clear coat over the paint and particles.

8. The method of claim 1 wherein the fibers of the first ply extend in a first direction and the fibers of the second ply comprising a plurality of chopped fibers which extend in a plurality of directions.

9. The method of claim 1 the step of taking the first image including taking the first image stereographically.

10. The method of claim 1 wherein the step of removing at least a portion of the first ply further including removing at least a portion of the first ply along a length of the side of the cured composite part.

11. The method of claim 10 wherein the step of removing at least a portion of the first ply further including removing the at least a portion of the first ply along a width of the cured composite part.

12. The method of claim 1 wherein the step of removing the at least a portion of the first ply including abrading the first ply.

13. The method of claim 1 wherein:
   the step of taking the second image including taking the second image stereoscopically; and
   further including a step of determining the residual strain of the cured composite part.

14. The method of claim 1, wherein:
   the step of taking a first image including:
   the cured composite part comprising a third ply in overlying relationship with the second ply such that the second ply is positioned between the first ply and the third ply; and
   the third ply comprising fibers wherein at least a portion of the fibers of the third ply are positioned in angular relationship with at least a portion of the fibers of the second ply;
   the step of removing at least a portion of the first ply including the at least a portion of the first ply removed is aligned with the at least two particles and the step of removing the at least a portion of the first ply further including removing at least a portion of the third ply aligned with the at least two particles; and
   the step of the taking of the second image of the at least two spaced apart particles occurs after the removal of the at least a portion of the first ply and after the removal of the at least a portion of the third ply.

15. The method of claim 14 wherein the fibers of the first ply and the third ply extend in a first direction and the fibers of the second ply are chopped fibers which extend in a plurality of directions.

16. The method of claim 14 wherein:
   the step of removing at least a portion of the first ply forms a first recess in the cured composite part;
   the step of removing at least a portion of the first ply further including removing at least a portion of the third ply forming a second recess in the cured composite part;
   the step of removing at least a portion of the first ply and at least a portion of the third ply comprising abrading the first ply and abrading the third ply; and
   the first and second recesses each extend across a width of the cured composite part and extend along a portion of a length of the side of the composite part.

17. The method of claim 16 wherein the step of removing includes the first recess and the second recess are symmetrically positioned with respect to the cured composite part.

18. The method of claim 14 wherein:
   the step of taking the first image including taking the first image stereographically;
   the step of taking the second image including taking the second image stereographically; and
   further including determining a residual strain in the cured composite part.

19. A system for measuring residual strain in a cured composite part, comprising:
   a first ply comprising fibers and a second ply comprising fibers wherein:
   the first ply and the second ply are positioned in overlying relationship; and
   at least a portion of the fibers of the first ply are in angular relationship with at least a portion of the fibers of the second ply; and
   at least two spaced apart particles are positioned on a side of the cured composite part and are associated with the second ply; and
   a camera assembly comprising two spaced apart cameras wherein each camera is in optical alignment with the at least two spaced apart particles.

20. The system of claim 19 further including an abrading tool in association with the first ply for removing at least a portion of the first ply in alignment with the at least two spaced apart particles.

* * * * *